United States Patent [19]
Boden et al.

[11] 3,908,966
[45] Sept. 30, 1975

[54] MIXING APPARATUS
[75] Inventors: Heinrich Boden, Opladen; Heinrich Ersfeld, Bergisch-Neukirchen, both of Germany
[73] Assignee: Bayer Aktiengesellschaft, Leverkusen Bayerwerk, Germany
[22] Filed: Sept. 16, 1974
[21] Appl. No.: 506,666

[30] Foreign Application Priority Data
Sept. 27, 1973  Germany............................ 2348608

[52] U.S. Cl...................... 259/4; 23/252 R; 425/4 R
[51] Int. Cl.²....................... B01F 15/02; B01F 3/08
[58] Field of Search............. 259/4, 18, 5, 6, 21, 22, 259/36; 23/252 R; 425/4 R, 130, 206

[56] References Cited
UNITED STATES PATENTS

| | | | |
|---|---|---|---|
| 2,885,268 | 5/1959 | Breer | 425/4 R |
| 3,057,273 | 10/1962 | Wilson | 259/4 |
| 3,123,342 | 3/1964 | Little | 259/4 |
| 3,206,171 | 9/1965 | Levake | 23/252 R |
| 3,353,918 | 11/1967 | Perrin | 259/4 |
| 3,788,337 | 1/1974 | Breer | 425/4 R |

*Primary Examiner*—Robert W. Jenkins
*Attorney, Agent, or Firm*—Lawrence S. Pope

[57] ABSTRACT

An apparatus of the "slide mixing head" type has a housing which encloses a mixing chamber provided with an outlet opening, vertical lift slides having injection openings for charging the mixing chambers, and a means for moving the lift slides comprising a yoke provided with an adjustable drive, a gate disposed between the lift slides and divided into an extension of the yoke and a housing partition, the injection opening of the vertical lift slides being covered by the housing partition and the opposite end faces of the housing partition and the yoke extension lying on top of one another in a rest position, while in a working position the mixing chamber is formed corresponding to the stroke height of the yoke between the opposite end faces of the housing partition and yoke extension, the outer surfaces of the vertical lift slides and a housing wall section.

13 Claims, 16 Drawing Figures

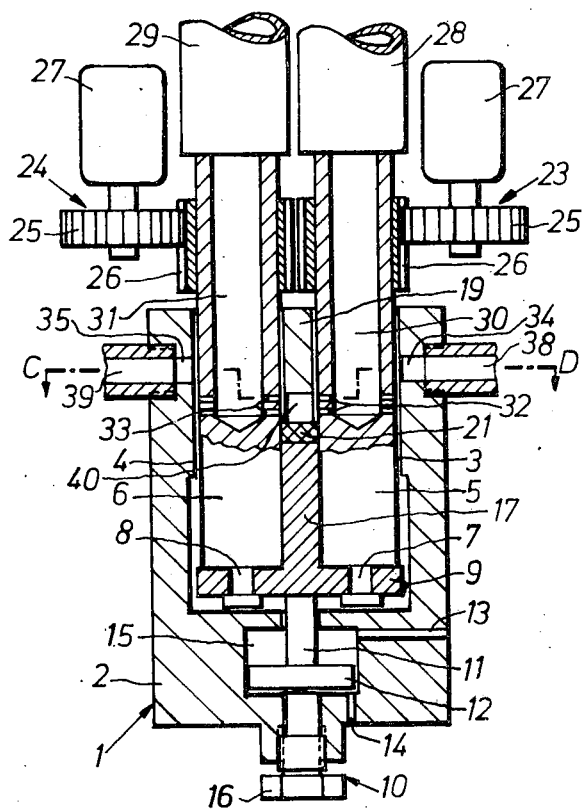
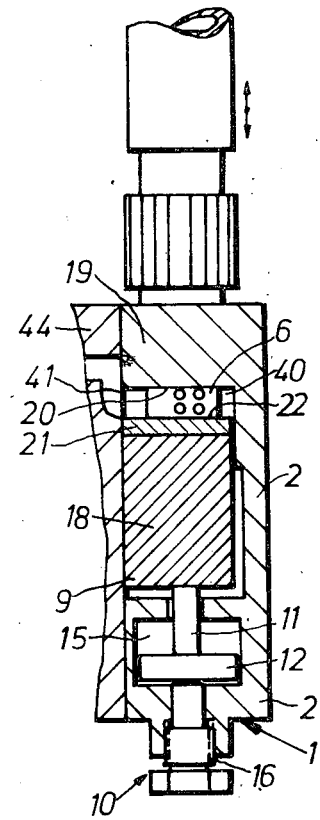
FIG. 1    FIG. 2
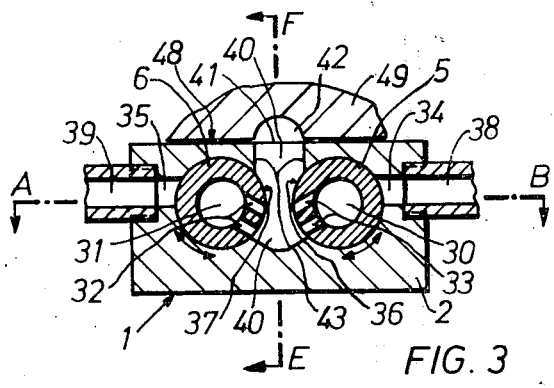
FIG. 3

MIXING APPARATUS

This invention relates to an apparatus for the production of foams or homogeneous materials from free-flowing reaction components, based for example on polyurethane.

Apparatus of these kinds are known as slide mixing heads and are commercially available. They are generally combined with molds. It is not always possible with conventional machines of this kind to prevent small quantities of the components from continuing to drip through at the end of the mixing operation, resulting in the formation, on the residue of the mixture which has fully reacted in the mixing chamber, of moist, tacky zones which foul the walls of the mixing chamber. The addition of a compressed-air flushing attachment does not produce the required result either. Solvent-based flushing systems cannot be used for physiological reasons and are too expensive. Accordingly, a mixing chamber that does not require cleaning by hardening the rest of the mixture in the mixing chamber has not been available. Moreover, removing the residue of the mixture by solidification in the mixing chamber is unsatisfactory because it represents a loss of material.

An object of the present invention is to provide an apparatus wherein the mixing chamber remains free from fouling and in which no residue of the mixture reacts to completion in the mixing chamber. Another object of the invention is to provide an improved apparatus for mixing the components of a foamable reaction mixture together. Still another object of the invention is to provide an improved mixing apparatus having vertical slide mixing heads communicating with a mixing chamber partially formed by the walls of the mixing heads which does not require cleaning between molding cycles.

Other objects will become apparent from the following description with reference to the accompanying drawing wherein:

FIG. 1 is a longitudinal section taken along the line A—B of FIG. 3 of one embodiment of the invention showing the vertical lift slides of the mixer in the working position;

FIG. 2 is a longitudinal section taken along the line E—F of FIG. 3 with the vertical slides in the working position;

FIG. 3 is a cross-section taken along the line C—D of FIG. 1 showing the vertical slides in the working position;

Figure 4:
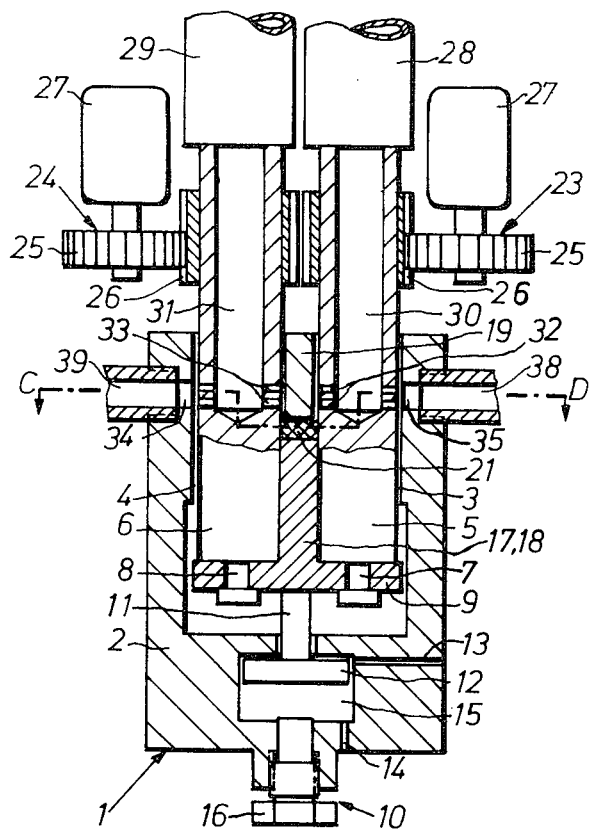
FIGS. 4, 5 and 6 are sections corresponding to those of FIGS. 1, 2 and 3, respectively, but with the vertical slides in the at-rest position.

The foregoing objects and others are accomplished in accordance with this invention, generally speaking, by providing a means for mixing liquid reactive components together which has a housing enclosing a cavity formed by two laterally spaced longitudinally extending bores with a portion of the wall of the housing therebetween removed to provide a mixing chamber, a cylindrical member having a bore therein and a closed end disposed in each bore with the external walls thereof forming a portion of the wall of the mixing chamber, ports in the walls of the cylindrical members for flow of fluid from the bore therein, openings through the housing wall communicating with the bores in which the cylindrical members slide, means for sliding the cylindrical members longitudinally in the bore, means for rotating the cylindrical members about their longitudinal axis to dispose the ports in communication with the mixing chamber or with the openings through the housing wall, and means for introducing a liquid reactive component into each cylindrical member.

When the machine is in use, the components cannot continue to drip into the mixing chamber because, when the machine is switched from its working or charging position to its rest or recycling position, the mixing chamber is completely displaced by the yoke extension. In this embodiment, the geometry of the mixing chamber can be optimized with particular advantage having regard to the interval between and the relative position of the injection openings, their height and their cross-sectional shape. When the machine is switched into its rest position, the remains of the mixture in the mixing chamber is subjected to intense turbulence and hence completely mixed by ejection with the yoke extension. The vertical lift slides are preferably connected to return pipes in the rest position. This measure is known per se and is used to insure smooth delivery of the components.

In order to improve sealing, the end face of the yoke extension is preferably covered by a layer of a plastics material, such as polytetrafluoroethylene, a polyurethane elastomer, or by a metal such as bronze, brass, copper aluminum.

By virtue of the fact that the mixing chamber is completely displaced in the rest position, the machine according to the invention, in suitably modified form, enables other problems to be solved:

In one particular embodiment, an adjustable stop is provided for limiting the stroke of the adjusting drive. In this way, the volume of the mixing chamber can be adapted to meet particular requirements. For example, it is possible in this way to influence the degree of mixing.

Each vertical lift slide is preferably provided with several injection openings. In the event of maximum elevation, i.e. when all the injection openings are released, this affords the advantage of several mixing centers so that it is possible to obtain particularly effective mixing. However, in cases where the injection volume is altered, it also affords the possibility of opening and closing several injection openings, providing the number and relative position of the injection openings is suitably selected. Accordingly, it is no longer necessary to release some of the injection openings in order to vary the injection volume, so that the quality of mixing is improved. To this end, the injection openings can be arranged in the same cross-sectional plane or in the same longitudinal plane, depending upon the required effects. They can also be arranged on a helical line. It is, of course, also possible for several rows of injection openings to be arranged horizontally or vertically adjacent one another.

The injection openings preferably differ in cross-section. The vertical lift slides are preferably adjustably fixed to the yoke. By suitably adjusting one of the vertical lift slides, a different number of injection openings is released for both vertical lift slides when the machine is switched into its working position, so that the dosing ratio can be varied in this way.

In another particular embodiment, the injection openings are directed towards the wall facing the outlet opening of the mixing chamber in the working position. Accordingly, the mixture has to flow through the narrow gap formed between the two vertical lift slides on its way to the outlet opening, so that special mixing effects are obtained.

In another preferred embodiment of the machine according to the invention, the yoke extension is suspended from adjustable entraining pins. In this embodiment, the injection openings are already fairly close to the mixing chamber before it is formed through entrainment of the yoke extension when the machine is switched to the working position. In this way, a better sealing effect is obtained in the rest position. The delay in formation of the mixing chamber can be adjusted through the adjustable effective length of the entraining pins. When the machine is switched from the working position into the rest position, the supply of components is interrupted through return of the vertical lift slides before the mixing chamber is displaced by the yoke extension.

The fact that the sprue is closed after the mixing operation makes it possible to use a much thicker sprue than is possible using known machines because it does not leave the finished article with any faults that have to be subsequently removed by cutting or machining. In the production of polyurethane integral foam moldings, sprue thickness has hitherto been limited to a maximum of 2 mm, because otherwise the foam structure of the core would have been visible on the surface of the molding following removal of the sprue or stalk and would have represented a fault. By increasing the thickness of the sprue bore, a corresponding reduction in stalk width is obtained for the same rate of flow.

In another particular embodiment, at least one of the vertical lift slides is coupled with a rotary drive. The rotary drive enables the dosing ratio between the components to be varied by turning one or both vertical lift slides, especially in cases where the vertical lift slides are not adjustably fixed to the yoke.

The machine according to the invention has proved to be of particular advantage in cases where the mixing head is combined with a mold, the mold dividing plane extending through or forming a tangent to the mixing chamber. It is obvious that the mold dividing plane cannot extend through the vertical lift slides. This known combination of mixing heads with molds affords the advantage that the sprue can generally be removed together with the molding. Another particular advantage is the plane surface which is easy to keep clean in the vicinity of the closed mixing chamber.

A groove-like sprue preferably adjoins the outlet opening of the mixing chamber in the mold. This groove-like sprue subsequently crosses over into the yoke extension and, at its end, adjoins the mold cavity in the working position, while in the rest position the mold cavity is at least partly shut off from the sprue by means of a sealing surface provided on the yoke extension. The advantage of this is that the sprue stalk is completely cut off from the molding. However, it has to be separately removed from the mold. On the other hand, however, a narrow connecting web can be left in the event of partial shut-off so that the sprue can be removed from the mold together with the molding, despite which the separation mark left following separation of the solidified sprue is sufficiently small.

In another preferred embodiment of the apparatus according to the invention, a remixer is arranged between the mixing head and the sprue. This remixer homogenizes the mixture even more effectively before it enters the mold cavity.

A throttle element is preferably arranged at the end of the sprue. The advantage of this is that the mixture has to flow over and beyond this throttle element in order subsequently to flow down the adjoining inner wall of the mold cavity. In this way, air bubbles are prevented from being included in the mixture.

In another particular embodiment of the apparatus according to the invention, the mold dividing plane extends through or forms a tangent to the remixer, a distributing channel leading away from the outlet opening of the mixing chamber branching into several connecting channels which open into a collecting channel. By dividing up the mixture into individual streams and recombining these individual streams, it is possible to obtain favorable remixing effect.

In another embodiment of the invention, the mixing chamber directly forms a tangent to the mold cavity in the dividing plane and, in the rest position, the mold cavity can be shut off by a sealing surface on the yoke extension. It is possible in this way to produce a sprue-free molding.

Referring now to FIGS. 1 to 6, a housing 2 has cylindrical bores 3 and 4 and vertical lift slides 5 and 6 slidably disposed in cylindrical bores 3 and 4 to form a mixing head 1. The vertical lift slides are connected to a yoke 9 by means of bolts 7 and 8. The yoke 9 and hence the vertical lift slides 5 and 6 are designed to be actuated by means of an adjusting drive 10. Drive 10 has a piston rod 11 which is fixed to the yoke 9 and which carries a double-acting hydraulic piston 12 guided in a pressure chamber 15 provided with inlets and outlets 13 and 14. The maximum elevation of the vertical lift slides 5 and 6 is adjustable by a stop 16 in the form of an adjusting screw. Between the vertical lift slides 5 and 6 there is a member 17 which is transversely divided into an extension 18 of the yoke 9 and a housing partition 19. The end face 22 of the yoke extension 18 is formed by a layer 21 of brass or the like. When the machine is in its rest position, this layer of brass lies on the end face 20 of the housing partition 19. At their other ends, the vertical lift slides 5 and 6 are provided with adjusting drives 23 and 24 each comprising a gearwheel 25, a pinion 26 and a motor 27. The control unit for the adjusting drives 23 and 24 is not shown; it is made of standard components similar to the control unit of the hydraulic adjusting drive 10. The feed lines 28 and 29 are flexible high pressure hoses and can be pushed directly on to the vertical lift slides 5 and 6, which have hollow bores 30 and 31 from which injection openings 32 and 33 lead off. In the recycle position (FIGS. 4 to 6) of the vertical lift slides 5 and 6, return bores 34 and 35 connect the hollow bores 30 and 31 via the injection openings 32 and 33 to return lines 38 and 39. In the working position (FIGS. 1 to 3), a mixing chamber 40 provided with an outlet opening 41 is formed by the vertical lift slides 5 and 6. The mixing chamber 40 is defined by the end face 22 of the yoke extension 18, the end face 20 of the housing partition 19, the outer surfaces 36 and 37 of the vertical lift slides 5 and 6 and the housing wall section 43. The injection openings 32 and 33 are directed, for example, towards the wall section 43 of the mixing chamber 40 facing the outlet opening 41, so that, on its way to the outlet opening 41, the mixture being formed has to pass through the narrow zone between the two vertical lift slides 5 and 6 and in doing so is subjected to an additional mixing effect before the mixture escapes through the outlet opening 41 which is arranged in a built-on plate 49. The outlet opening 41 opens into a groove 42 formed with the mold 44 in the vicinity of the mold dividing plane 48. The groove 42 can be designed as a sprue to the mold cavity or as a mixing-head outlet channel.

Figure 7:
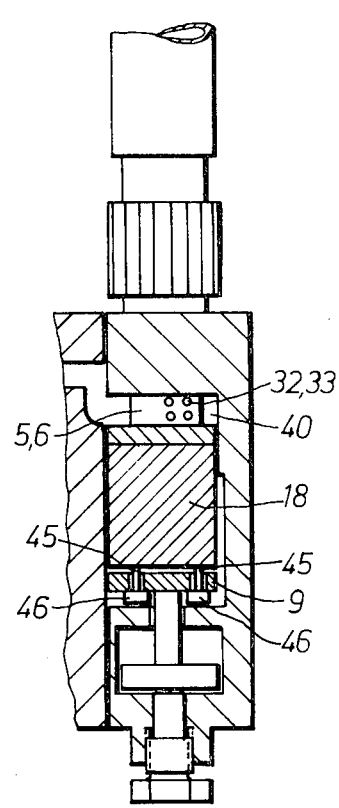
FIG. 7 is a longitudinal section similar to that of FIG. 2 showing the vertical slides in a working position in a modification of the embodiment of FIGS. 1–6.
Figure 8:
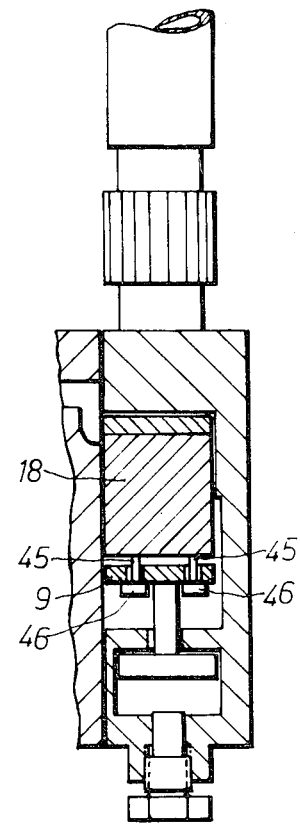
FIG. 8 illustrates the embodiment of FIG. 7 in longitudinal section in the at-rest position.

In FIGS. 7 and 8, the yoke extension 18 is supported on the yoke 9 on entraining pins 45 and 46. The stroke length of the entraining pins 45 and 46 can be adjusted by means of nuts 46. When the vertical lift slides 5 and 6 are switched from their rest position (FIG. 8) into their working position (FIG. 7), formation of the mixing chamber 40 is delayed by an amount corresponding to the adjusted stroke length of the entraining pins 45 in comparison with the beginning of the stroke of the vertical lift slides 5 and 6. When, on the other hand, the vertical lift slides are switched from their working position to their rest position, the flow of components from the injection openings 32 and 33 is interrupted correspondingly earlier than the mixing chamber 40 is displaced by the yoke extension.

Figure 9:
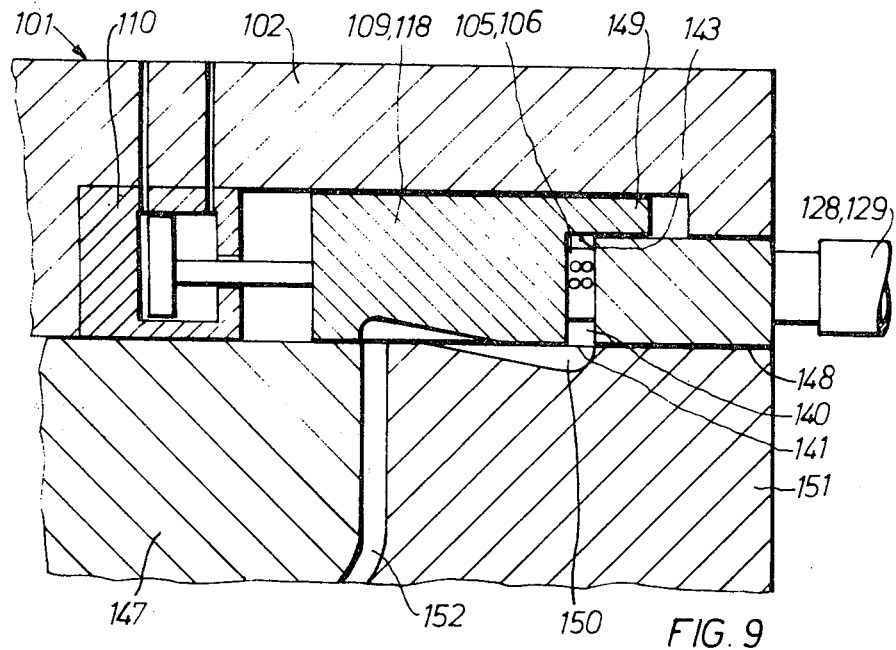
FIG. 9 illustrates the embodiment of FIGS. 1–6, in a fragmentary longitudinal section in combination with a mold and with the vertical slides in the working position.
Figure 10:
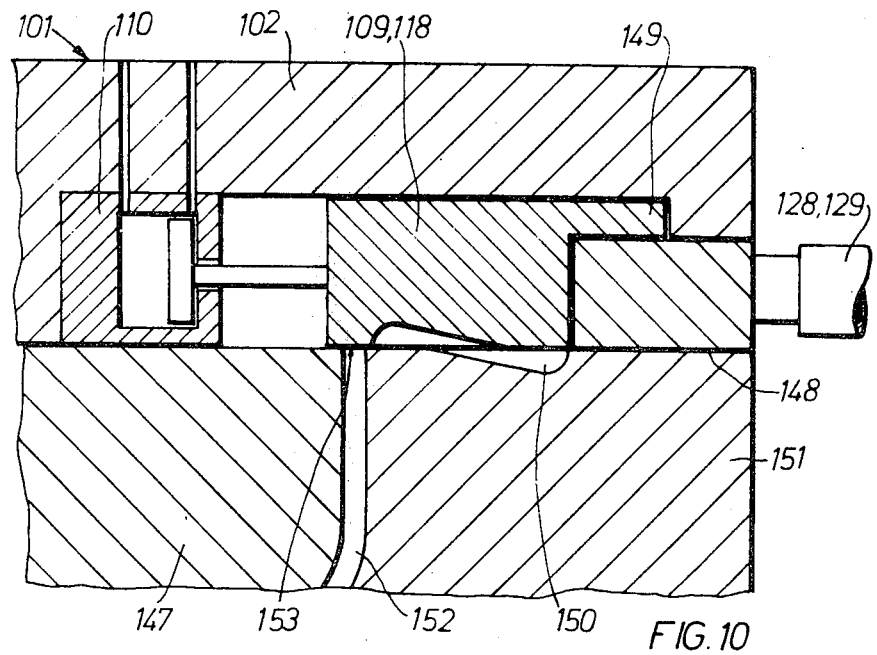
FIG. 10 illustrates the combination of FIG. 9 in the rest position.

As shown in FIGS. 9 and 10, a mixing head 101 is arranged with its housing 102 on a mold 147, the mold dividing plane 148 being at a tangent to the mixing chamber 140 and the yoke extension 118. The components to be mixed flow from the storage containers (not shown) through feed lines 128 and 129 into vertical lift slides 105 and 106, which are mounted on a yoke 109. The yoke 109 is actuated by an adjusting drive 110 as described with reference to FIGS. 1 to 6. The yoke extension 118 is provided with a guide nose 149 which, in this embodiment, simultaneously forms the rear wall 143 of the mixing chamber. A sprue 150 in the mold wall 151 leads away from the mixing chamber 140 and crosses over into the yoke extension 118. It terminates in such a way that, in the working position, the mixing chamber 140 communicates with the mold cavity 152. In the rest position, shown in FIG. 10, the mixing chamber 140 has been displaced and a sealing surface 153 on the yoke extension 118 closes the mold cavity 152. The stalk obtained in the sprue 150 can be removed separately from the molding. If the length of the sprue 150 is such that the sealing surface 153 does not completely separate the stalk from the molding, the two can be removed together and the stalk subsequently cut off.

Figure 11:
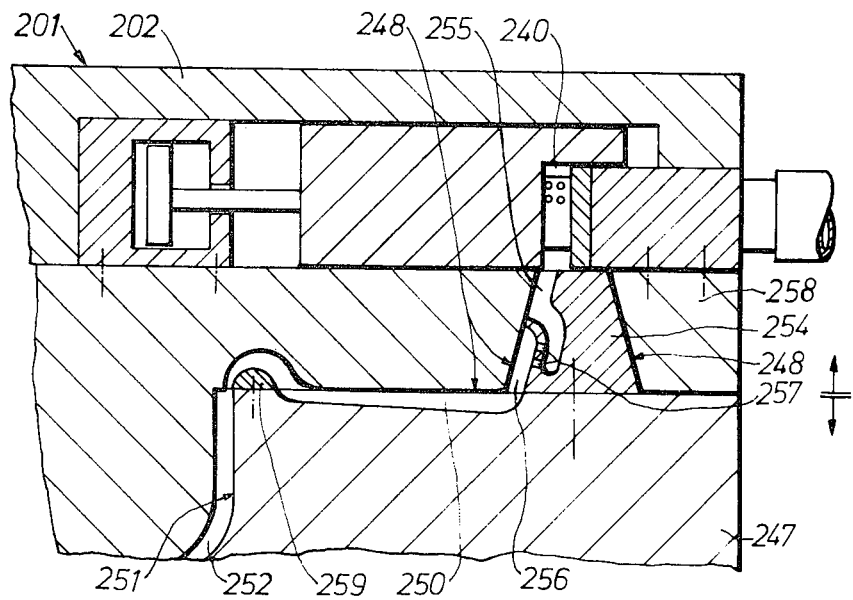
FIG. 11 is a fragmentary longitudinal section illustrating an embodiment of a vertical slide mixer and a mold with a remixer and with the vertical lift slides in the working position.
Figure 12:
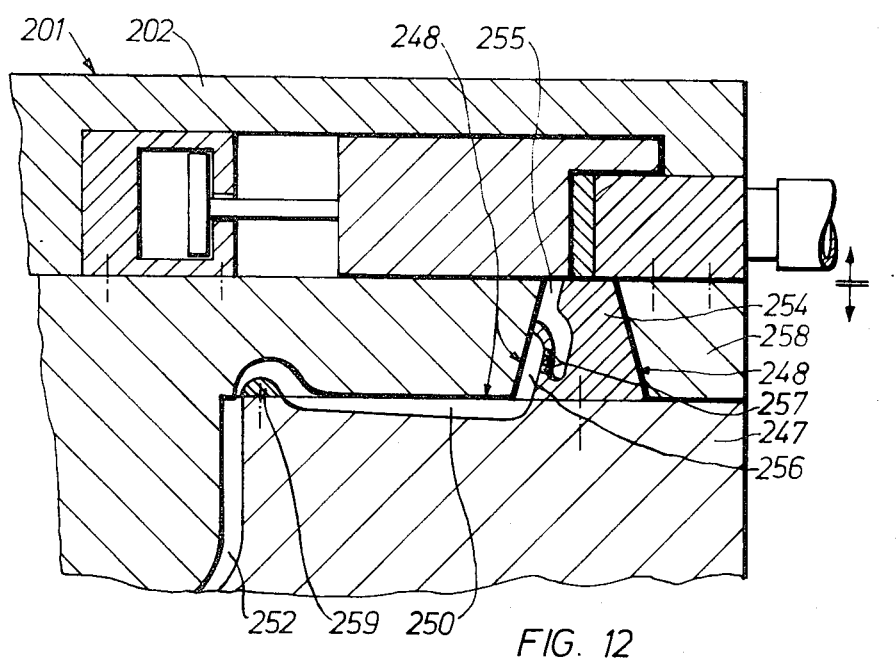
FIG. 12 illustrates the embodiment of FIG. 11 with the vertical lift slides in the rest position.

In the embodiment shown in FIGS. 11 and 12, the mixing head 201 is arranged with its housing 202 on a mold 247 and 258. A remixer 254 is arranged between the mixing chamber 240 and the sprue 250. For manufacturing reasons, it is in the form of a frustum into whose surface are machined a distributing channel 255 leading off from the mixing chamber 240 and a collecting channel 256 opening into the sprue 250. The distributing channel 255 and the collecting channel 256 are connected by three narrow connecting channels 257. The mold dividing plane 248 forms a tangent to the mixing chamber 240 and then runs along the conical surface of the remixer 254 and subsequently through the sprue 250. The sprue 250 begins in the wall of the lower part 247 of the mold and subsequently crosses over into the upper part 258 of the mold. At the end of that part of the sprue 250 extending through the lower part 247, there is arranged an overflow nose 259 serving as a throttle member beyond which the sprue 250 is guided in the upper part 258, finally opening in the mold cavity 252 in such a way that the liquid reaction mixture can be distributed onto the surface 251.

Figure 13:
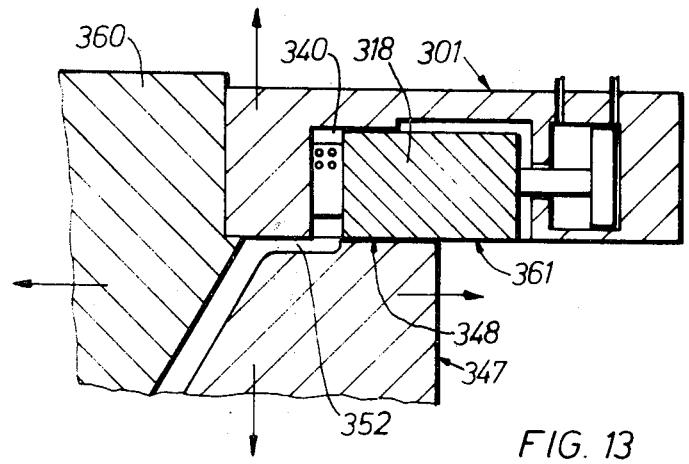
FIG. 13 is a fragmentary longitudinal section of a portion of another embodiment of the invention showing a slide mixhead in combination with a mold.

In the embodiment illustrated in FIG. 13, a mixing head 301 is fixed to the upper half 360 of the mold 347 in such a way that the mixing chamber 340 lies directly above the mold cavity 352. This arrangement is known as direct gating. In the rest position of the mixing head 301, part of the sealing surface 361 of the yoke extension 318 acts as a boundary wall to the mold cavity 352. The mold dividing plane 348 also runs along this sealing surface 361.

Figure 14:
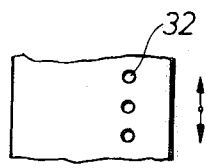
FIGS. 14–16 illustrate possible variations in the arrangement of injection openings in the mixing heads.

As shown in FIG. 14, the injection openings 32 are arranged one above the other in the stroke direction and have the same cross-section.

Figure 15:
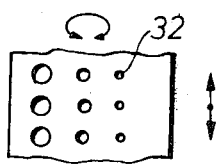

As shown in FIG. 15, three rows of injection openings 32 are arranged one above the other. Each row has injection openings 32 of different cross-section. In this case, the injection volume can be controlled both by turning and by lifting the vertical lift slides.

Figure 16:
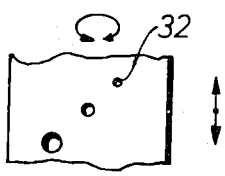

As shown in FIG. 16, the injection openings 32 are arranged along a helical line on the surface of the slides. They differ in cross-section. The injection volume can be controlled both by lifting and also by turning the slides.

Figure 5:
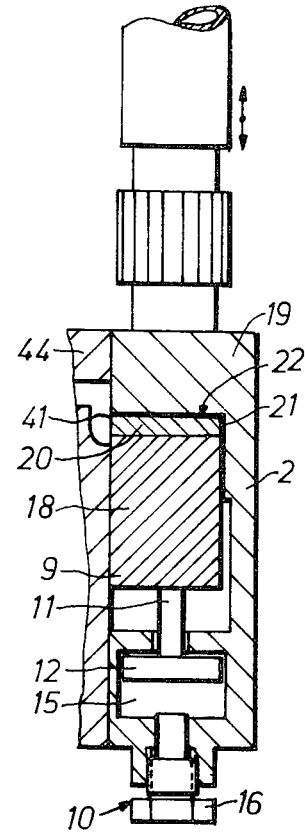
Figure 6:
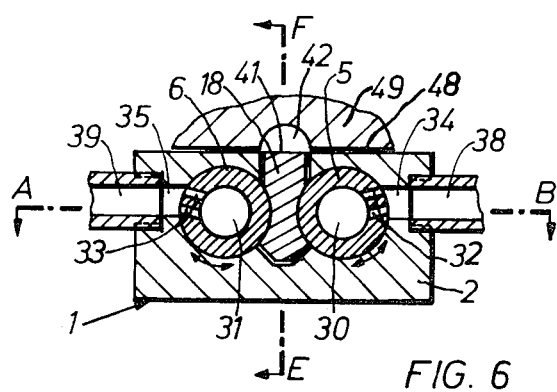

In operation of the embodiment of FIGS. 1 through 6, tubular slides 5 and 6 may be moved to the recycling position shown in FIGS. 4 through 6 with ports 34 and 35 communicating with return lines 38 and 39 and a liquid component A which may contain an organic polyisocyanate or prepolymer and a catalyst may be pumped through the bore 30 while a component B which may contain an organic polyol, blowing agent and other conventional additives is pumped through bore 31. The tubular slides 5 and 6 may then be moved to the position shown in FIGS. 1 through 3 and liquid components A and B injected into mixing chamber 40 until the desired volume of reactive components A and B for mold 44 has been mixed. Then the tubular slides 5 and 6 may be moved back to the recycling position and liquid components recycled through 38 and 39 until another mold is ready to be changed.

The mixing apparatus provided by the invention may be used to mix any liquids together and can be used to advantage in making polyurethane plastics by mixing suitable components like those disclosed by Saunders and Frish in the book *Polyurethanes: Chemistry and Technology*, published by Interscience Publishers.

Although this invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. An apparatus for mixing free-flowing liquid reaction components which react to form a synthetic resin or the like comprising a mixing head having a housing which surrounds a mixing chamber, an outlet opening from the chamber through the housing, at least two vertical lift slides having injection openings which communicate with the said chamber, a yoke coupling said lift slides together, means for driving the yoke, said yoke having an extension thereon disposed between the vertical lift slides which combines with a housing partition to form a gate, the injection openings of the vertical lift slides being covered by the housing partition and the opposite end faces of the housing partition and the yoke extension lying on top of one another in a rest position, while in a working position the mixing chamber is formed corresponding to the stroke height of the yoke between the opposite end faces of the housing partition and yoke extension, the outer surfaces of the vertical lift slides and a housing wall section.

2. The apparatus of claim 1 wherein return bores in the vertical lift slides are connected to return lines in the rest position.

3. The apparatus of claim 1 wherein the end face of the yoke extension comprises a covering of plastic or metal.

4. The apparatus of claim 1 wherein an adjustable stop is provided for limiting the stroke of the adjusting drive.

5. The apparatus of claim 1 wherein each vertical lift slide is provided with a plurality of injection openings.

6. The apparatus of claim 5 wherein the injection openings lie in the same cross-sectional plane.

7. The apparatus of claim 5 wherein the injection openings lie in the same longitudinal plane.

8. The apparatus of claim 5 wherein the injection openings lie on a helical line.

9. The apparatus of claim 5 wherein the injection openings differ in cross-section.

10. The apparatus of claim 1 wherein in the working position, the injection openings are directed towards the housing wall facing the outlet opening of the mixing chamber.

11. The apparatus of claim 1 wherein the yoke extension is mounted on adjustable entraining pins.

12. The apparatus of claim 1 wherein at least one of the vertical lift slides is coupled to a rotary drive.

13. An apparatus for mixing liquids together comprising a housing enclosing a pair of laterally spaced longitudinal bores and a cavity therebetween which extends into the bores whereby the wall of each bore extends less than 360° but more than 180° around the bore, a tubular member having a closed end slidably disposed in each bore, means for introducing fluid under pressure into each tubular member and ports in the walls of the tubular members for flow of fluid therefrom, means for flow of fluid from each bore, means for moving the tubular members comprising a transverse member attached to the closed ends of the tubular members and having a longitudinally extending member which forms a movable partition which extends across the cavity between the tubular members and to a point below the said ports, said moving means being adapted to move the tubular members alternately to a position for charging liquids to a mixing chamber and to a position communicating with the said means for flow of fluid from the bores, a stationary partitioning member disposed between the tubular members across the cavity whereby the two partitioning members are spaced apart when the tubular members are in the charging position and are in sealing engagement with each other when the tubular members are in the recycling position, the facing surfaces of the partitioning members, the housing and the sides of the tubular members which are exposed to the cavity combining to enclose a mixing chamber for fluids flowing from the tubular members in the charging position, means for rotating the tubular members for communication of ports with the mixing chamber when in the charging position and with the means for flow of fluid from the bores when disposed in the recycling position, and means for flow of fluid from the mixing chamber.

* * * * *